(12) United States Patent
Zadok

(10) Patent No.: US 6,697,118 B2
(45) Date of Patent: Feb. 24, 2004

(54) STABILIZING HOLDER FOR HAND HELD CAMERA

(76) Inventor: Adam Zadok, 1623 S. 56th Ct., Cicero, IL (US) 60804

( * ) Notice: Subject to any disclaimer, the term of this patent is extended or adjusted under 35 U.S.C. 154(b) by 255 days.

(21) Appl. No.: 09/923,467

(22) Filed: Aug. 6, 2001

(65) Prior Publication Data

US 2003/0025827 A1 Feb. 6, 2003

(51) Int. Cl.⁷ .......................... H04N 5/225; G03B 17/00
(52) U.S. Cl. .................. 348/375; 396/420; 396/428
(58) Field of Search ............................... 348/373, 374, 348/375, 376; 396/419, 420, 421, 422, 424, 428

(56) References Cited

U.S. PATENT DOCUMENTS

| | | | | |
|---|---|---|---|---|
| 3,427,102 A | * | 2/1969 | Wade | 352/95 |
| 4,187,021 A | | 2/1980 | Balser | 354/293 |
| 4,206,983 A | * | 6/1980 | Nettman et al. | 352/243 |
| 4,283,135 A | | 8/1981 | Lupis | 354/293 |
| 4,569,579 A | | 2/1986 | Kangas | 354/293 |
| 5,098,182 A | * | 3/1992 | Brown | 352/243 |
| 5,721,997 A | * | 2/1998 | Powell et al. | 396/420 |
| 5,742,859 A | * | 4/1998 | Acker | 396/419 |
| 5,767,906 A | * | 6/1998 | Toyofuku et al. | 348/375 |
| 6,030,130 A | | 2/2000 | Paddock et al. | 396/421 |
| 6,196,504 B1 | * | 3/2001 | Lemke | 396/428 |
| 6,347,892 B1 | * | 2/2002 | Paddock et al. | 396/421 |

FOREIGN PATENT DOCUMENTS

| | | |
|---|---|---|
| FR | 2 793 870 | 11/2000 |
| GB | 2 325 393 | 11/1998 |
| WO | WO 96/154404 | 5/1996 |

* cited by examiner

*Primary Examiner*—Aung Moe
*Assistant Examiner*—Luong Nguyen
(74) *Attorney, Agent, or Firm*—Freling E. Baker; Brown Martin Haller & McClaim

(57) ABSTRACT

A hand held stabilizer holder for hand held cameras comprises a first frame having a hand grip and a pivot mount spaced from the hand grip; a second frame pivotally mounted to the first frame at the pivot mount, and a camera mount on the second frame disposed below the pivot mount so that the camera remains in its orientation upon pivoting of the holder.

14 Claims, 5 Drawing Sheets

STABILIZING HOLDER FOR HAND HELD CAMERA

BACKGROUND OF THE INVENTION

The present invention relates generally to movie cameras and pertains particularly to an improved holder for stabilizing hand held movie cameras.

It is difficult for the typical individual to hold a hand held movie or video camera reasonably steady while filming any target. It is particularly difficult for the average person to get good pictures while filming moving targets. It is also difficult whether the operator is moving or standing still and particularly moving targets while the operator is moving. This inability to hold hand held movie and video cameras steady often result in blurry, jerky and unstable pictures.

Some attempts have been made in the past to provide means for steadying cameras while the operator is moving. These attempts have been largely directed to large commercial cameras and involve providing a large harness with a spring supported camera support frame.

The inventor is not aware of any efforts to provide stable support for personal cameras for the average consumer.

There is an evident need for a stabilizing holder for personal hand held movie cameras.

SUMMARY AND OBJECTS OF THE INVENTION

It is the primary object of the present invention to provide a stabilizing holder for personal hand held movie cameras that overcome the above problems of the prior art.

In accordance with a primary aspect of the present invention, a hand held movie camera comprises an first frame having a hand grip and a pivot mount spaced from said hand grip, a second frame pivotally mounted to said first frame at said pivot mount, and a camera mount on said inner frame member disposed below said pivot mount so that said camera functions as a pendulum

BRIEF DESCRIPTION OF THE DRAWINGS

The above and other objects and advantages of the present invention will become apparent from the following description when read in conjunction with the accompanying drawings wherein.

DETAILED DESCRIPTION OF PREFERRED EMBODIMENTS

The present invention solves the aforementioned problems of the prior art by means of an apparatus for a hand held movie camera which comprises a first frame having a hand grip and a pivot mount spaced from said hand grip, a second frame pivotally mounted to said first frame at said pivot mount, and a camera mount on said second frame disposed below said pivot mount so that said camera functions as a pendulum.

Figure 1:
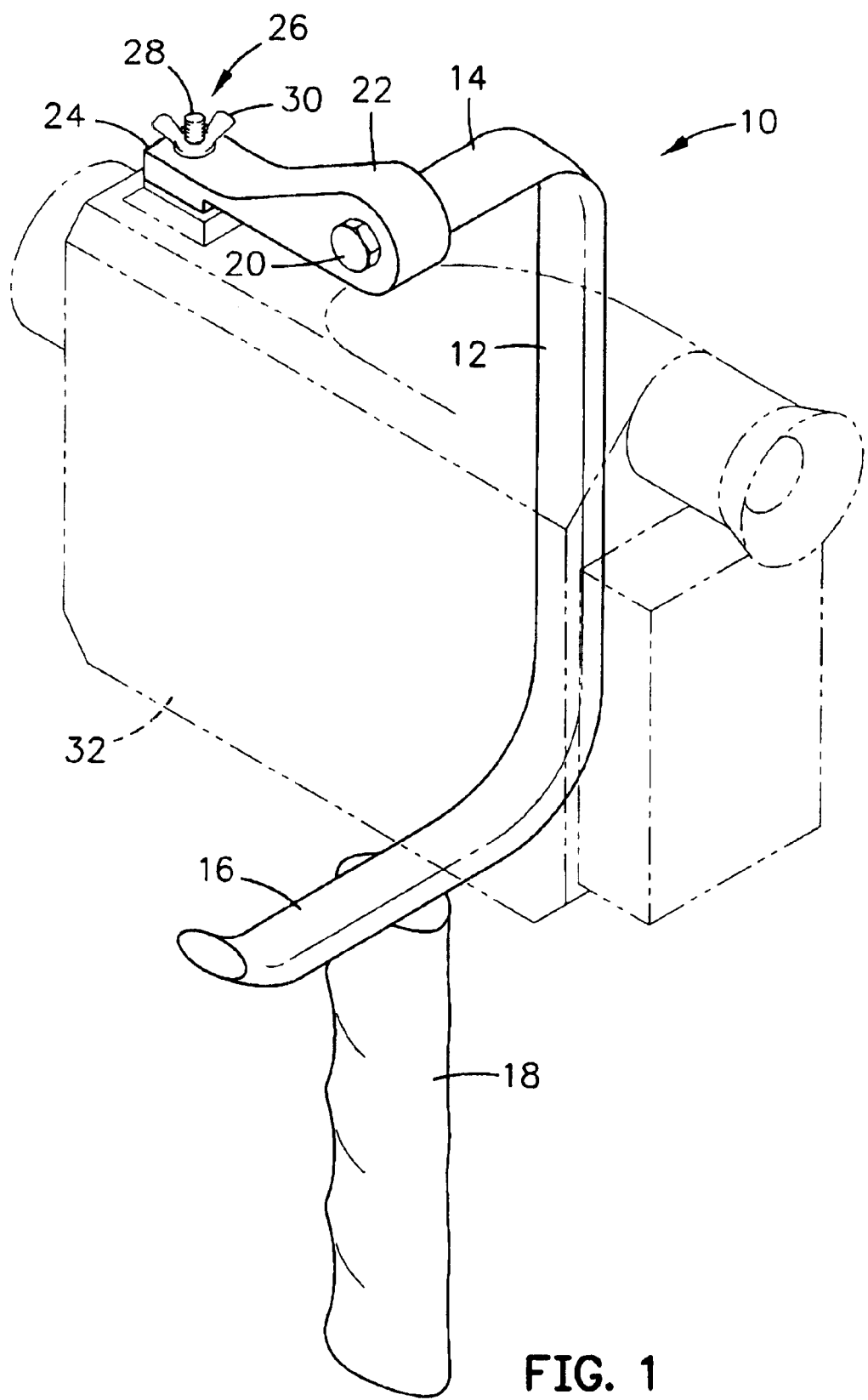
FIG. 1 is perspective view of a first exemplery embodiment of the present invention.

Referring now more specifically to the drawings, and particularly to FIG. 1, a hand held stabilizer holder for hand held cameras is illustrated and designated generally by the numeral 10. The stabilizer holder comprises a first frame having a generally C configuration with a generally vertical center bar 12, an upper arm 14 and a lower arm 16. the lower arm extends horizontally outward and a hand grip 18 is secured to the center thereof and extends downwardly. The illustrated hand grip is of a generally conventional design for ease of gripping and holding. The stabilizer holder is designed to be preferably held vertically as illustrated in FIG. 1.

A horizontal pivot mount or pin 20, which in the illustrated embodiment is a stud or bolt is mounted on the outer end of upper arm 14. The pivot mount is positioned directly above and spaced from the handgrip and is adapted to pivotally mount a second or inner frame or arm 22. A second frame 22 is pivotally mounted to the first frame at said the mount. The second frame 22 is illustrated as an elongated arm extending generally horizontally and having a quick connect camera mount assembly 26 at the outer end. The quick connect mount is of a conventional construction with a bolt 28 and wing nut 30 and is adapted to detachably connect to a camera mount on top of a video camera shown in phantom. As can be seen, the camera is mounted and hangs below the pivot 20 and is free to swing and remain level if the holder is tilted forward or backward. This is a simple stabilizer construction that eliminates one component of the operator movement input to the camera.

Figure 2:
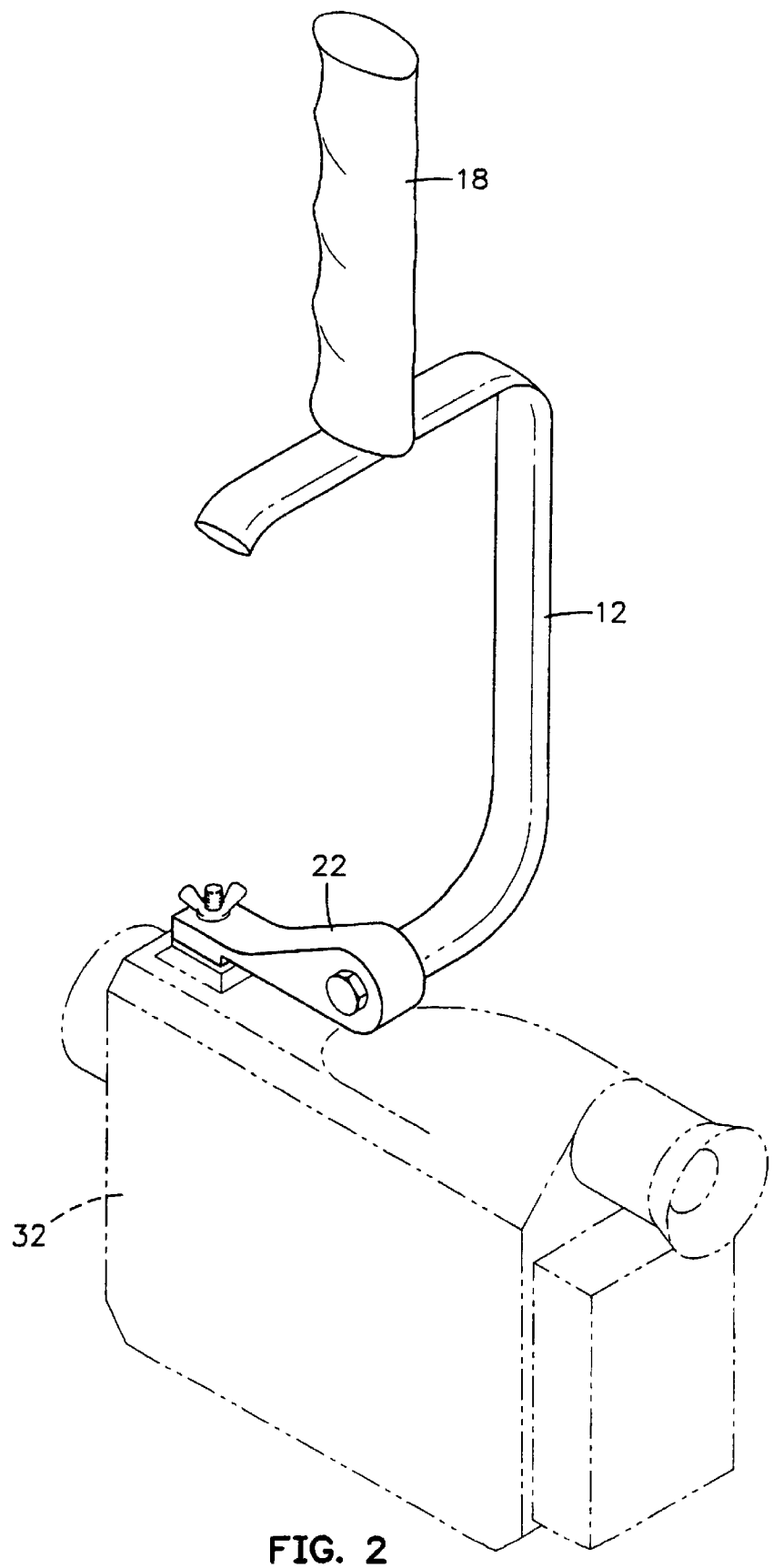
FIG. 2 is perspective view of the embodiment of FIG. 1 in an alternate mode of operation.

In operation, the camera is normally held in the holder upright position as shown in FIG. 1. When the operator tilts the holder fore or aft, the camera pivots or tilts about axis 20 and remains level. The holder construction also enables the holder to be positioned with the grip in the upper position as shown in FIG. 2 to allow the camera to be lowered below the operator's waist for lower angle shots. The holder has the same stabilizing effect eliminating the longitudinal axis fore and aft operator input tilt as in the FIG. 1 mode of operation.

Figure 3:
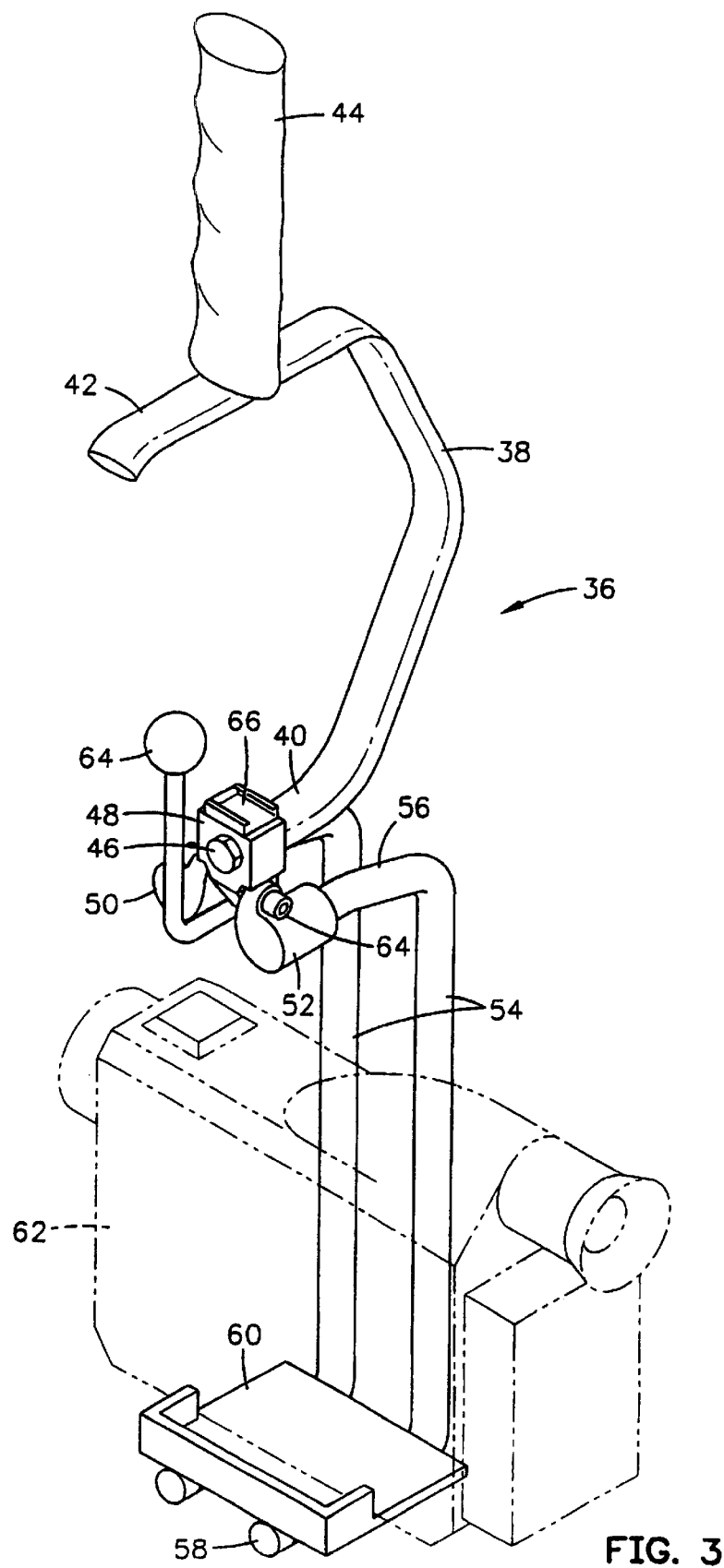
FIG. 3 is view like of FIG. 2 in an alternate embodiment of the invention.

Referring to FIG. 3, an alternate embodiment of the invention is illustrated and designated generally by the numeral 36. This embodiment is illustrated with the main or outer frame in the uppermost position solely for ease in illustration of the various components of the overall holder. This embodiment comprises a first or outer main frame as having a generally C configuration with a generally outward curved somewhat V shaped vertical center bar 38 with an upper arm 40 and a lower arm 42. The terms vertical, horizontal, upper and lower are used only in the text of preferred normal use of the holder simply for ease of understanding. The lower arm extends horizontally outward and includes a hand grip 44 that is attached or secured to the center thereof and extends downwardly. The hand grip is of a generally conventional construction but may be of custom design for ease of gripping and holding. The stabilizer holder is constructed and configured to be held vertically as is illustrated in FIG. 1 for that embodiment.

A horizontal pivot mount or pin 46, which in the illustrated embodiment is a stud or bolt is mounted on the outer end of upper arm 40. The pivot mount is positioned directly above and spaced from the handgrip in normal operation as in the prior embodiment. The pivot pin is adapted .to pivotally mount a second or inner frame assembly which is in the form of a four bar linkage. A second frame assembly is pivotally mounted to the first frame at the pivot mount.

The second frame assembly is illustrated as a four bar linkage having an upper bar consisting of a journal block 48 and a pair of journal blocks 50 and 52 mounted on block 48. A pair of elongated generally C shaped vertical bars 54, each having an upper horizontal arm 56 and a lower horizontal arm 58. The upper arms 56 are journaled for pivoting in blocks 50 and 52 and the lower arms 58 are mounted for pivoting or rotating in a pair of journals (not shown) on a mounting platform 60. The mounting platform 60 forms a fourth bar of the four bar linkage and mounts a camera 62 shown in phantom. This linkage enables the camera to move fore and aft without swinging vertically. The pivot 46 enables the hand grip and outer frame to pivot about a horizontal axis without movement of the horizontal axis of the camera moving.

The upper bar of the four bar linkage consisting of a journal block 48 and a pair of journal blocks 50 and 52 includes an additional horizontal pivot shaft or pin 64 that is generally parallel to the longitudinal axis of the camera. This pivot or swivel allows the camera and grip to move laterally about this horizontal axis relative to one another, this eliminates another operator input motion to be isolated from the camera. A lever arm is attached to this upper linkage of the four bar linkage to enable the operator to swing the camera fore and aft relative the outer frame and hand grip. The camera will remain level during this movement.

A quick connect camera mount 66 is shown on the block 48. Such a mount is also preferably on the mounting platform 60 and the platform is preferably mounted to pivot or swing to a side away from the bars 54 to enable ease of attachment or detachment of the camera thereto. The holder is preferably constructed and configured to enable a camera to be mounted with a mount on the top of the camera or the bottom of the camera. The quick connect mount is of a conventional construction and is adapted to detachably connect to a camera mount on top or bottom of a video camera shown in phantom. As can be seen, the camera is mounted and hangs below the gimbals or pivot and is free to swing and remain level if the holder is tilted forward or backward. This is a simple stabilizer construction that eliminates one component of the operator movement input to the camera.

Figure 4:
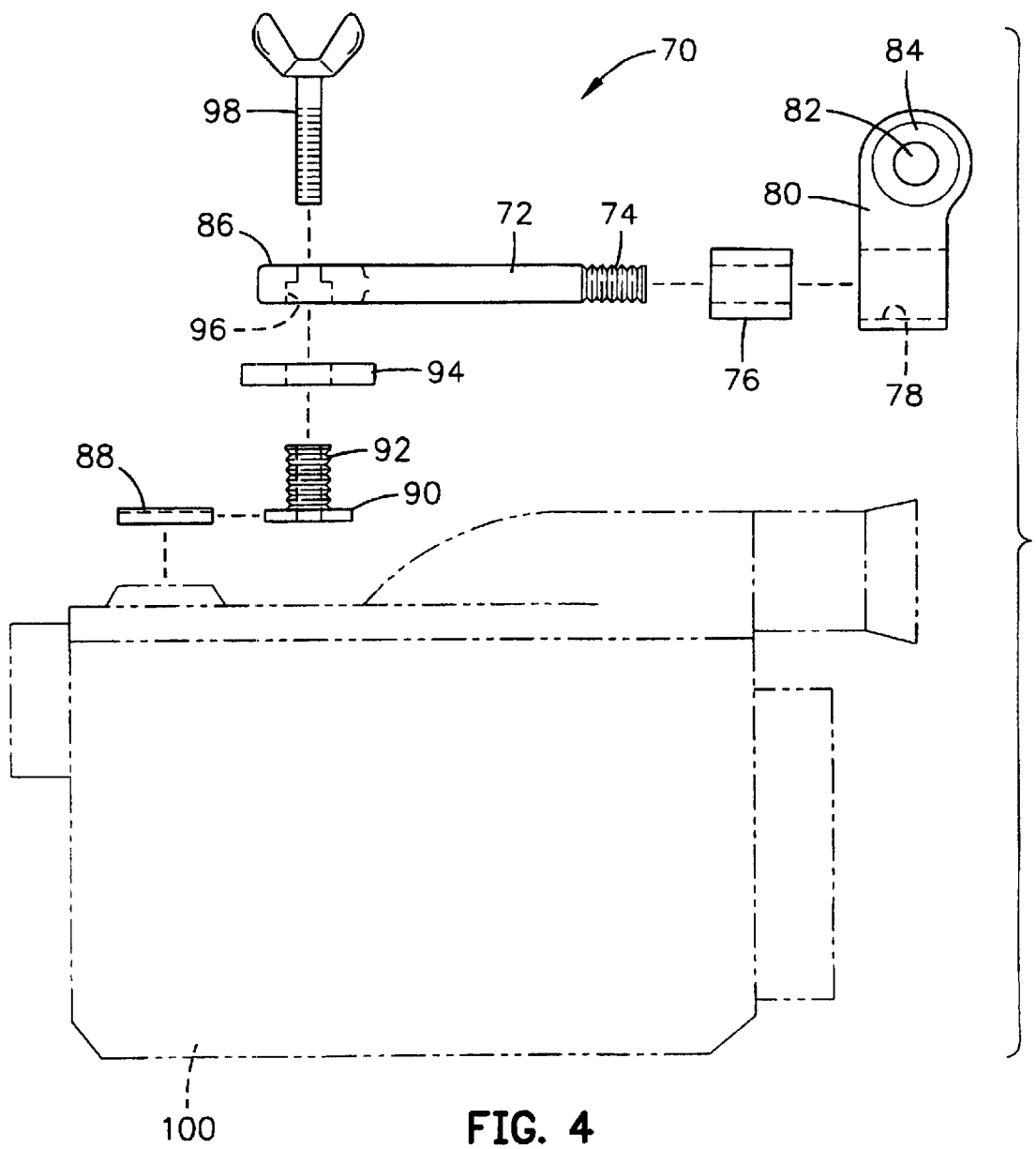
FIG. 4 is a side elevation exploded view of portions of another embodiment of the invention.
Figure 5:
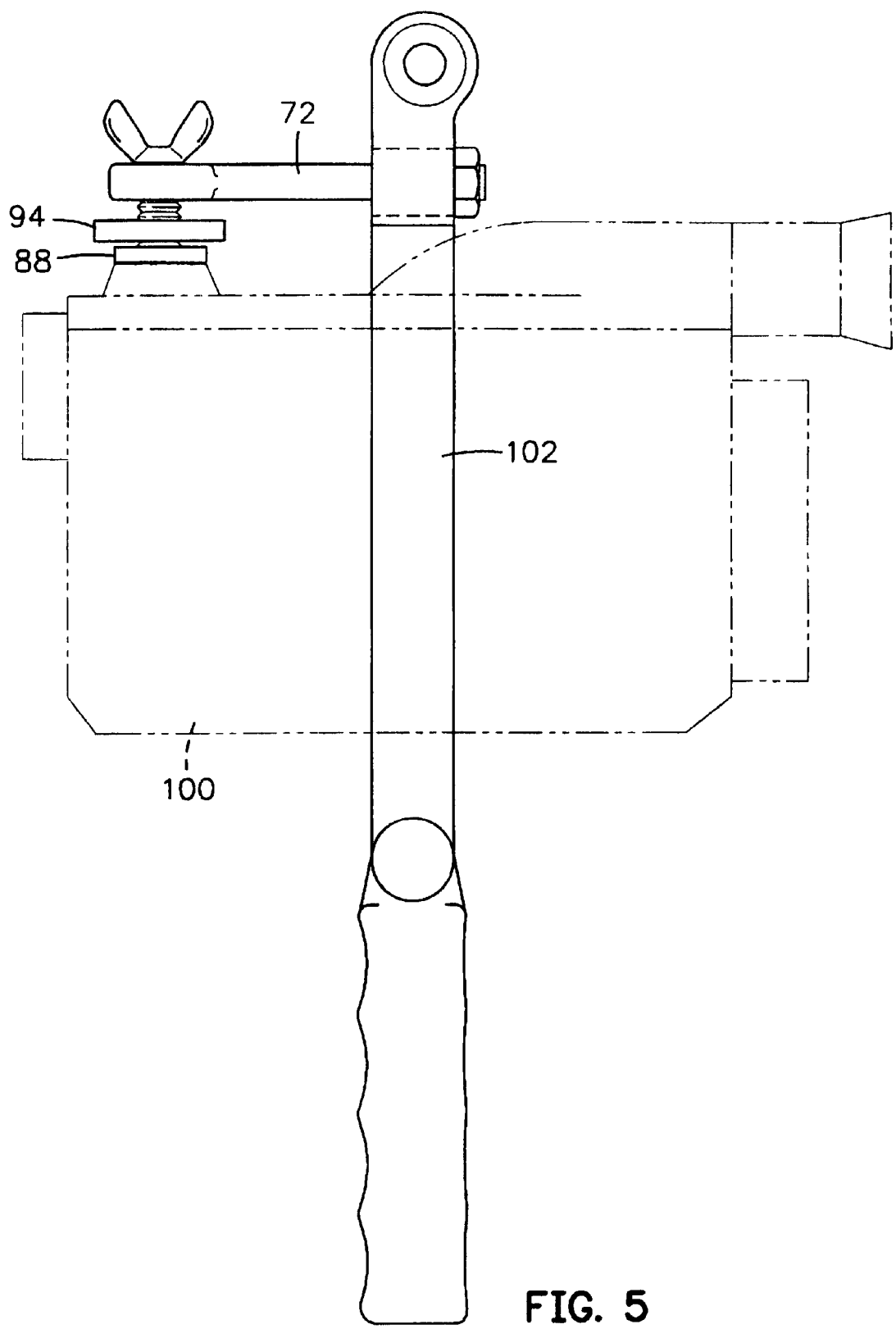
FIG. 5 is a side elevation view of the complete assembly of the embodiment of FIG. 4.

Referring to FIGS. 4 and 5 another embodiment of the invention is illustrated. The inner or camera mount frame of the holder is illustrated in FIG. 4 and designated generally by the numeral 70. The frame comprises an elongated arm or frame member 72 having an inner end 74 mounted for rotation about its longitudinal axis in a bearing 76 mounted in a bore 78 in a pivot link or arm 80. The arm or link 80 has a transverse bore 82 within a bearing 84 for mounting on a pivot pin 86 of an outer frame 102 as in previous embodiments (FIG. 5).

A quick connect camera mount is on an outer end 86 of the frame or arm 72 includes a slot member 88 for mounting on the camera and for receiving a rectangular head 90 of a threaded tubular shaft bolt 92. A threaded disc nut 94 threadably mounts on the threaded outer surface of bolt 92 and clamps the head 90 in place in the member 88 on top of a camera. The bolt 92 is mounted in a stepped bore 96 of frame member 72 and secured by a wing bolt 98. This holder embodiment enables the mounting of a video camera 100 (in phantom) to enable it to pivot about orthogonal horizontal axes and reduce the operator input to unwanted movement to the camera. It will be apparent that either one of the first and second frames or both may be formed as a U shape or a closed loop and may have numerous other configurations. Anyone of the holders may be mounted on any mobile or static supports such as tripods, monopods, springed vests, remote operated model cars, etc.

In operation, the camera is normally held in the holder upright position as shown in FIGS. 1 and 5. When the operator tilts the holder fore or aft, or side to side, the camera pivots or tilts about a horizontal axis and remains level. The holder construction also enables the holder to also be positioned with the grip in the upper position as shown in FIGS. 2 and 3 to allow the camera to be lowered below the operator's waist for lower angle shots. The holder has the same stabilizing effect eliminating the longitudinal axis fore and aft operator input tilt as in the FIG. 1 mode of operation.

While I have illustrated and described my invention by means of particular embodiments, it is to be understood that numerous changes and modifications may be made in the invention without departing from the spirit and scope of the invention, which is to be, limited only by the scope of the appended claims.

I claim:

1. A stabilizer holder for hand held cameras comprising:
    a first elongated frame member having a normally vertical orientation, a distal end and a proximal end, a normally vertical hand grip mounted at said proximal end and a pivot mount having at least a first normally horizontal pivot axis B;
    a second frame pivotally mounted to said first frame at said pivot mount for freely pivoting about said horizontal axis; and
    a camera mount on said second frame disposed below said pivot axis for mounting a camera so that the combined center of gravity of said camera and said second frame are disposed below said horizontal pivot axis.

2. A stabilizer holder according to claim 1 wherein said pivot mount has a second pivot axis orthogonal to said first axis and said second frame pivots about said first and second orthogonal axes.

3. A stabilizer holder according to claim 1 wherein said pivot mount is normally disposed directly above said hand grip in operation.

4. A stabilizer holder according to claim 1 wherein said second frame is a four bar linkage that maintains a camera in a normally uniform horizontal orientation when pivoting about said first axis.

5. A stabilizer holder according to claim 4 wherein said pivot mount has a second pivot axis orthogonal to said first axis and said second frame pivots about said first and second orthogonal axes.

6. A stabilizer holder according to claim 1 wherein said hand grip is mounted on said lower arm in substantial axial alignment with said pivot mount.

7. A stabilizer holder according to claim 1 wherein said second frame is an elongated arm extending at a right angle to said pivot axis.

8. A stabilizer holder according to claim 6 wherein said second frame normally extends horizontally when a camera is mounted on an outer end thereof.

9. A hand held stabilizer holder for hand held cameras comprising:
    an elongated first frame having a normally vertical orientation and a generally C configuration with an upper arm and a lower arm normally extending horizontally, a pivot mount having at least a normally horizontal first pivot axis on said an outer end of said upper arm and a normally vertical hand grip mounted on said lower arm;
    a second frame pivotally mounted to said first frame at said pivot mount to freely pivot about said first axis; and a camera mount on said second frame disposed to position a camera below said pivot mount so that the combined weight of said camera and said second frame is below said first pivot axis.

10. A stabilizer holder according to claim 9 wherein said pivot mount includes a second axis orthogonal to said first axis and said second frame is pivotally mounted to pivot about said first axis and said second axis.

11. A stabilizer holder according to claim 9 wherein said second frame is a four bar linkage that maintains a camera in a normally uniform horizontal orientation when said second frame is pivoting about said first axis.

12. A stabilizer holder according to claim 11 wherein said pivot mount includes a second axis orthogonal to said first axis and said second frame is pivotally mounted to pivot about said first axis and said second axis.

13. A stabilizer holder according to claim 11 wherein said second frame comprises a pair of generally C shaped linkage members disposed generally vertically and pivotally mounted to an upper bar forming said pivot mount and a lower bar defining a camera mount.

14. A stabilizer holder according to claim 13 wherein said pivot mount includes first and second pivots configured to pivot about orthogonal axes.

* * * * *